Patented July 22, 1941

2,250,390

UNITED STATES PATENT OFFICE 2,250,390

COLLOIDAL SILVER IODIDE COMPOSITION

Michael G. Minaeff, Metuchen, John P. Greze, Dunellen, and Rudolf J. Priepke, New Brunswick, N. J., assignors to A. C. Barnes Company, Inc., New Brunswick, N. J., a corporation of Delaware No Drawing. Original application December 10, 1938, Serial No. 244,920. Divided and this application November 26, 1940, Serial No. 367,216

1 Claim. (Cl. 252—317)

This invention relates to improvements in colloidal silver iodide compounds and/or preparations such as are used in medicine as mildly antiseptic or bacteriostatic agents. Such preparations commonly contain about 20% of silver iodide which is present in colloidal form.

There are several such preparations in actual use at the present time. It is generally advised that such preparations in solution be freshly prepared for use and that they should not be employed after standing for several days or more than one week.

We have found that collodial silver iodide compounds made by the ordinary well known methods are lacking in chemical stability and also that such solutions are subject to mold growth.

We have found that solutions of commercial silver iodide compounds lack the stability mentioned, and also that molds would grow when their spores are introduced in solutions of these preparations. We prepared colloidal silver iodide compounds by the well known methods and found that such preparations were not fungistatic or resistant to mold growth.

We disclose as the essence of this invention our discovery that the incorporation of colloidal zinc compound with silver iodide preparations imparts to their solutions the property of inhibiting mold growth. We have also found that the incorporation of colloidal zinc compound stabilizes the silver iodide compounds to light in a marked degree, particularly in cases when it is desired to prepare these compounds free from excessive amounts of alkali iodide. We also found that the addition of colloidal zinc compound stabilizes the solution of colloidal silver iodide compounds against precipitation or chemical deterioration.

A colloidal silver iodide compound of good quality should form a translucent solution when first prepared and it should preserve its translucency as long as possible. It has been found that some commercial preparations are only slightly translucent when freshly prepared and in a few days become opaque and form a sediment or precipitate, indicating chemical instability.

The following silver iodide compounds, both commercial and specially prepared by us, were tested and found to permit mold growth:

No. 1. Two well known market preparations of silver iodide compounds.

No. 2. Silver iodide compound prepared by us from "Argyrol" by the method described in the United States Patent No. 1,610,391, issued December 14, 1926.

No. 3. Silver iodide compound prepared by us from "Silvol" by the method described in the United States Patent No. 1,610,391, issued December 14, 1926.

No. 4. Silver iodide compound prepared by us in accordance with United States Patent No. 1,783,334, issued December 2, 1930.

No. 5. Silver iodide compounds prepared by us by the well known method of direct interchange of ions between soluble silver salts and soluble iodides, such as silver nitrate on the one hand and sodium iodide or potassium iodide on the other, in the presence of protective colloids, such as powdered egg albumen, gelatin, gum karaya, and Russian isinglass.

With all of these silver iodide preparations as listed above we found that their solutions when inoculated with spores of *Aspergillus fumigatus* or *Penicillium italicum*, and incubated at room temperature (25–30° C.) will develop mold growth. We found further that incorporation in each of these silver iodide compounds of a quantity of colloidal zinc compound (1% zinc in dry colloidal silver iodide compound is often sufficient) would render these compounds fungistatic, that is, their solution would be substantially resistant to mold growth. The silver iodide preparations containing colloidal zinc also provided stable solutions showing remarkable resistance to light and chemical deterioration.

The following are specific examples of useful preparations:

A method of preparing a suitable colloidal zinc compound will be described because we found that colloidal zinc preparations were not commercially available. To prepare a colloidal zinc compound suitable for the purposes of the invention herein disclosed, 60 grams of gelatin are dissolved in 120 cc. of hot water and heated to 175° F. 3 grams of sodium hydroxide are dissolved in 10 cc. of water and mixed with the gelatin solution. The mixture is heated for two hours at 180° F. in a water bath. A half gram of infusorial earth and 55 cc. of water are then added to the mixture and the mixture filtered. After being allowed to cool there is mixed quickly thereinto a solution of 7.8 grams of zinc chloride dissolved in as little water as possible, thereby forming a solution which is clear by transmitted light but appears cloudy when viewed by reflected light. This resulting solution contains zinc in the form of a colloidal compound suitable for the purposes of this invention and may be directly added to silver iodide preparations or it may be dried and redissolved as needed.

Several complete methods of preparing the product of this invention will now be described in detail, including the methods which were employed for preparing the silver iodide compounds of Examples No. 2, No. 3, and No. 4, listed above.

*Example I (colloidal silver iodide, No. 2)*

A mixture of 47 grams of gelatin, 43 cc. of 4% sodium hydroxide, and 180 cc. of water is heated at the boiling temperature for about five minutes. This mixture is then cooled a little, filtered, and divided into two equal parts. One part is mixed with a solution of 50 grams of "Argyrol" or other mild silver protein in 250 cc. of water. 12 grams of iodine crystals are placed in a mortar and ground with the "Argyrol"-gelatin solution until the solution is light yellow in color. The resulting colloidal silver iodide is decanted from the excess iodine and mixed with the other or remaining part of the gelatin solution. The pH value of the final mixture is then adjusted to about 7.0 to 9.0 with a suitable acid, such as acetic acid. The preparation is then dried on plates at 180° F. in a stream of air. The dried product contains about 20% of silver iodide. This preparation, it may be noted, is in accordance with the method described in U. S. Patent No. 1,610,391.

Speaking generally, to prepare the product of this invention, to a solution of the above colloidal silver iodide compound, either before drying or by re-dissolving the dried product, there is added a calculated amount of colloidal zinc preparation and the final solution evaporated and the product dried.

In order to produce the product of this invention in the proper proportions the following complete procedure should be followed when preparing a product in which the colloidal silver iodide compound is made in accordance with the method of Example I.

*Example I—A (colloidal silver iodide with colloidal zinc compound)*

A mixture of 47 grams of gelatin, 43 cc. of 4% sodium hydroxide, and 180 cc. of water is heated at the boiling temperature for about five minutes. This mixture is then cooled a little, filtered, and divided into two equal parts. One part is mixed with a solution of 50 grams of "Argyrol" in 250 cc. of water. 12 grams of iodine crystals are placed in a mortar and ground with the "Argyrol"-gelatin solution until the solution is light yellow in color. The resulting colloidal silver iodide is decanted from the excess iodine. A colloidal zinc compound solution is prepared by mixing a solution of 2.4 grams of zinc chloride in as little water as possible with the remaining portion of the gelatin solution. This colloidal zinc compound solution is mixed with the colloidal silver iodide solution and the resulting solution adjusted to a pH value of about 7.0 to 9.0 with a suitable acid, such as acetic acid, if necessary. The preparation is then dried on plates at 180° F. in a stream of air. The dried product contains about 20% of silver iodide and about 1% of zinc in the form of a colloidal compound.

*Example I—B (colloidal silver iodide with colloidal zinc compound No. 3)*

The procedure under this example is exactly the same as that in the above (Example I—A) except that "Silvol" is used in place of "Argyrol."

*Example II (colloidal silver iodide, No. 4)*

50 grams of gelatin is boiled with 2 grams of sodium hydroxide in 625 cc. of water for one-half hour under a reflux condenser. The solution is allowed to cool and is filtered. One-fifth of this solution is reserved for addition later. The remainder is placed in a two-liter beaker provided with vigorous stirring and a shield of paper to keep out direct light. A solution of 7.5 grams of silver nitrate in 100 cc. of water and a solution of 2.65 grams of sodium chloride in 100 cc. of water are added slowly and simultaneously to the gelatin solution, care being taken to always keep the sodium chloride present in excess. After these solutions have been added a solution of 11 grams of sodium iodide in 300 cc. of water is added slowly by means of a dropping funnel. This addition requires two hours and the solution is stirred an additional hour. The reserved portion of the gelatin solution is now added and the preparation placed in a pig bladder suspended in running water and dialyzed forty hours. It is then spread on glass plates and dried in a current of air at 180° F.

This preparation is in accordance with the method described in U. S. Patent No. 1,783,334.

*Example II—A (colloidal silver iodide with colloidal zinc compound)*

50 grams of gelatin is boiled with 2 grams of sodium hydroxide in 625 cc. of water for one-half hour under a reflux condenser. The solution is allowed to cool and is filtered. One-fifth of this solution is reserved for use in the preparation of colloidal zinc compound. The remainder is placed in a two-liter beaker provided with vigorous stirring and a shield of paper to keep out direct light. A solution of 7.5 grams of silver nitrate in 100 cc. of water and a solution of 2.65 grams of sodium chloride in 100 cc. of water are added slowly and simultaneously to the gelatin solution, care being taken to always keep the sodium chloride present in excess. After these solutions have been added a solution of 11 grams of sodium iodide in 300 cc. of water is added slowly by means of a dropping funnel. This addition requires two hours and the solution is stirred an additional hour. The reserved portion of gelatin solution is now mixed quickly with 1 gram of zinc chloride dissolved in as little water as possible. The zinc-gelatin mixture is added with stirring to the silver iodide colloid. The preparation is placed in a pig bladder suspended in running water and dialyzed forty hours. It is then spread on glass plates and dried in a current of air at 180° F. The resultant dried product is a preparation comprising colloidal silver iodide compound and colloidal zinc compound.

It will be at once apparent to those skilled in the art that some variations in the invention herein disclosed will be readily apparent without departure from the true nature, spirit and scope of this invention. We do not wish to be limited to the specific disclosures herein given by way of example but rather by the scope of the claim granted us. For example, we do not wish to be limited to a particular method of preparing the colloidal zinc compound or to final colloidal silver iodide compounds containing colloidal zinc compounds prepared only by the method herein disclosed.

This application is a division of our copending application Serial No. 244,920, filed December 10, 1938, for Method of preparing colloidal silver iodide composition and the product.

What is claimed is:

A substantially dry composition easily soluble in water containing colloidal silver iodide and a colloidal zinc compound.

MICHAEL G. MINAEFF.
JOHN P. GREZE.
RUDOLF J. PRIEPKE.